Nov. 26, 1957  J. SCHLECHTER  2,814,499
AUTOMOBILE STEERING DEVICE
Filed May 10, 1955  2 Sheets-Sheet 1

INVENTOR.
JOSEPH SCHLECHTER
BY
ATTORNEY

Nov. 26, 1957 J. SCHLECHTER 2,814,499
AUTOMOBILE STEERING DEVICE
Filed May 10, 1955 2 Sheets-Sheet 2
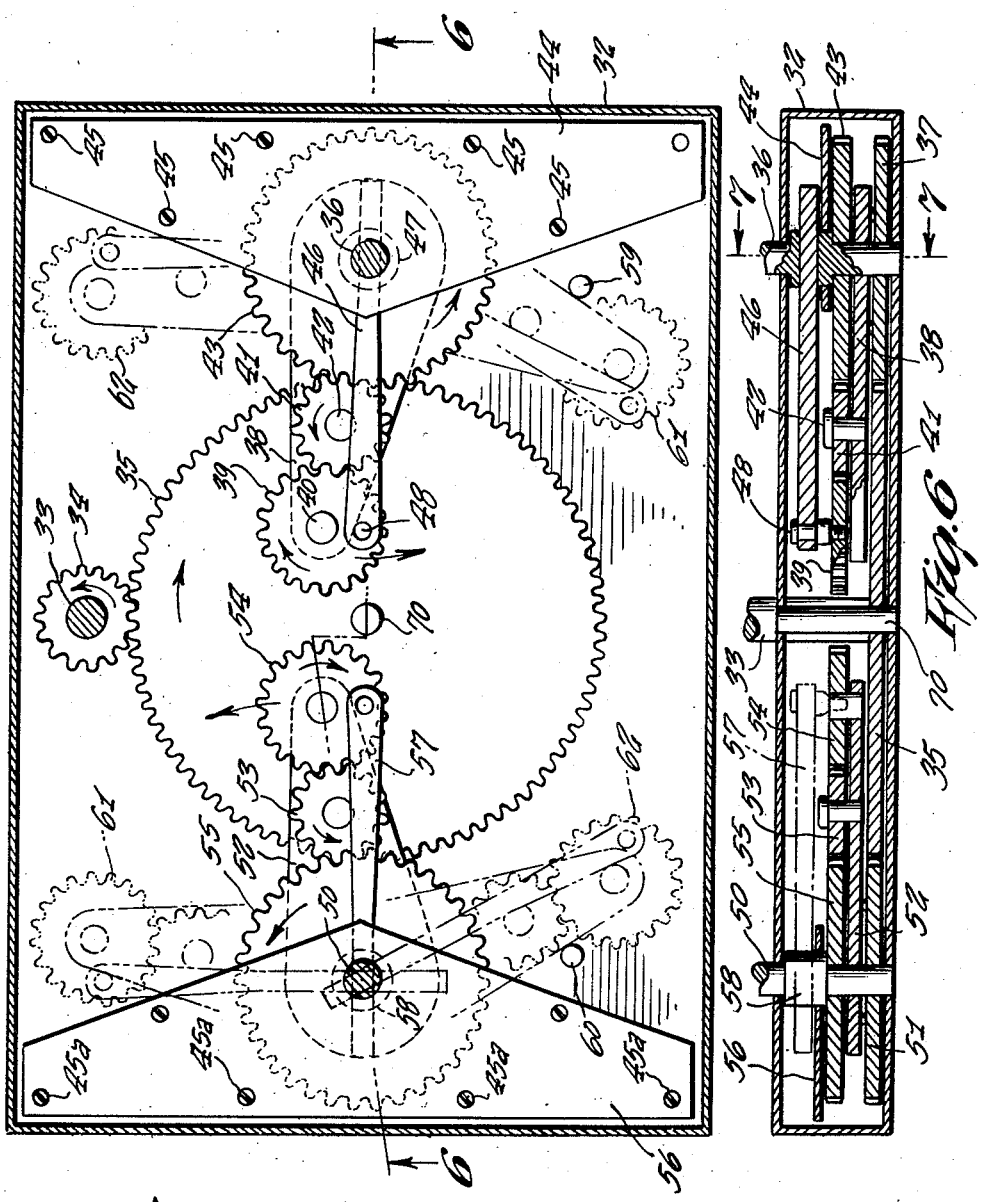
INVENTOR.
JOSEPH SCHLECHTER
BY
ATTORNEY United States Patent Office 2,814,499
Patented Nov. 26, 1957

1

2,814,499

AUTOMOBILE STEERING DEVICE

Joseph Schlechter, Haifa, Israel

Application May 10, 1955, Serial No. 507,397

10 Claims. (Cl. 280—93)

This invention relates to steering mechanism for vehicles, and particularly to such a mechanism as is employed in automobiles or automotive vehicles. It is highly desirable to provide steering mechanism which will permit the front wheels of the vehicle to be swung around at a large angle in order to facilitate maneuvering of the vehicle. In particular, it is of considerable advantage in parking the vehicle in a narrow area or space. Attempts have been made to provide mechanisms which accomplish the desired result but they have been only partially successful. In one such prior art mechanism, the front wheels were joined together by a linkage arrangement which permitted both of the wheels to be shifted over a relatively large angle, but said wheels were always parallel to each other, and they could not be shifted far enough to give the maximum effect.

The present invention is intended and adapted to overcome the difficulties and disadvantages of the prior art, it being among the objects of the invention to provide a steering mechanism which will permit the front wheels of the vehicle to be swung to any position with accurate corresponding angles of both wheels up to an angle of approximately ninety degrees, which arrangement is not possible with present wheel mountings and steering means therefor.

It is a further object of the invention to provide a steering means and wheel mounting which will permit the pivotal wheels of the vehicle to be swung to approximately ninety degrees as above stated and which will, as a result, greatly facilitate the parking of the vehicle in relatively small space. It is a further object of the invention to provide a steering means by which the turning radius of the car will be greatly reduced, thus increasing the maneuverability of the car.

It is still a further object of the invention to provide a steering arrangement and wheel mounting so constructed that the stability of the car at high speeds will be materially increased.

With these and other objects to be hereinafter set forth in view, I have devised the arrangement of parts to be described and more particularly pointed out in the claims appended hereto.

In the accompanying drawings, wherein an illustrative embodiment of the invention is disclosed, Fig. 1 is a front elevational view from the driver's position, of a wheel mounting and steering apparatus constructed in accordance with the invention;

Fig. 5 is a top plan view of the housing for the gearing which actuates the steering mechanism, with the cover

Figure 7:
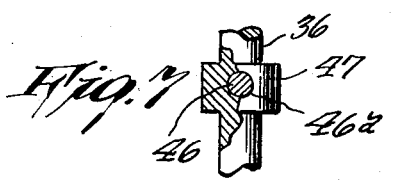

2 plate of the housing removed to disclose the contained gearing;

Fig. 6 is a sectional view, taken substantially on the line 6—6 of Fig. 5, looking in the direction of the arrows, and Fig. 7 is a sectional view, taken substantially on the line 7—7 of Fig. 6, looking in direction of the arrows.

Figure 1:
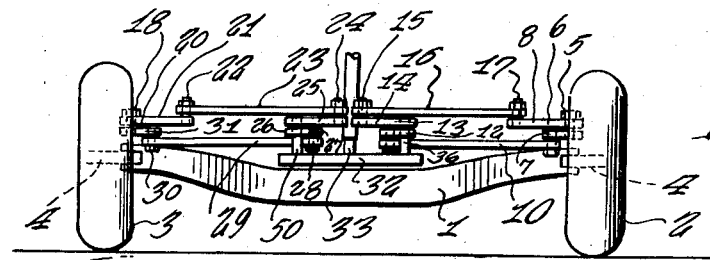

In Fig. 1 is disclosed the front axle 1 of an automobile or other automotive vehicle, and the front wheels indicated respectively at 2 and 3, are each rotative upon the respective stub axles 4 pivoted in the opposite ends of the axle 1 in the known manner. The stub axle 4, upon which the wheel 2 is rotatively mounted, has the vertical pin 5 to which is secured a two-armed or bell-crank lever 6 having the arms 7 and 8. The end of the arm 7 is pivotally attached at 9 to one end of a link or rod 10, which has its opposite end pivotally connected at 11 to an arm 12 of a two-armed or bell-crank lever 13. The second arm of the bell-crank 13, and indicated at 14, is pivotally connected at 15 to one end of a link or rod 16, similar to that shown at 10, and which has its opposite end pivotally connected at 17 to the arm 8 of the bell-crank 6.

The connections for the second wheel, or that shown at 3, are similar to those described with respect to wheel 2. Fastened to the upper end of the vertical pin 18, arising from the stub axle 4 of wheel 3, is a two-armed or bell-crank lever 20 having an arm 21 pivotally connected at 22 to one end of a link or rod 23 which has its opposite end pivotally connected at 24 to an arm 25 of a two-armed or bell-crank lever 26. The second arm of the bell-crank 26, or that shown at 27, is pivotally connected at 28, to one end of a rod or link 29, which has its opposite end pivotally attached at 30 to the end of the second arm 31 of the bell-crank 20.

The housing in which the gearing is contained by which the steering is effected, is generally indicated at 32, and the same is in the form of a relatively shallow or flat receptacle mounted on and supported by the front axle 1 between the wheels 2 and 3. At 33 is shown a vertical shaft which extends into the housing 32, and externally of the housing 32 said shaft is coupled to the steering post of the vehicle by gearing or other coupling means, not shown, but which is effective to rotate the shaft 33 in the desired direction according to the turning movements of the steering wheel. Secured on the shaft 33 within the housing 32 (Fig. 5) is a pinion 34 which is in mesh with a large or main driving gear 35 rotative on shaft 70 and is effective to rotate the latter gear 35 when the shaft 33 is rotatively moved by steering-wheel manipulation.

The bell-crank 13 is secured upon a vertical spindle 36 which extends through and is capable of oscillatory or rotative movement in the housing 32. Loose on the spindle 36 is a lower gear 37 which is in mesh with the gear 35 so that when gear 35 is rotatively moved by movement of the steering wheel, gear 37 will be caused to rotatively move in the opposite direction.

Also loose on the spindle 36 is an arm 38 which is attached to the gear 37 and moves with the same, said arm 38 being provided, adjacent to its outer end, with a pinion 39 rotative on a stud 40 extending upwardly and vertically from arm 38. Said pinion 39 is in mesh with another pinion, indicated at 41, and rotative on a stud 42 extending vertically upward from the arm 38, which pinion 41 is in mesh with a fixed gear 43. The gear 43 is loose upon the spindle 36 and is held against rotative movement by being secured to a plate 44 which is fastened to, and held spaced from the bottom of the housing 32 by means of the screws 45 and spacing sleeves used thereon. At 46 is shown a bar which, as seen in Fig. 7, is longitudinally slidable through a transverse aperture 46a in the hub portion 47 of the spindle 36. Secured eccentrically to the pinion 39 and extending upwardly therefrom, is a pin 48 to which the outer end of the bar 46 is pivotally connected.

The arrangement above described is such that when the gear 35 is rotated through its engagement with the pinion 34, and which pinion is rotated through its connection to the steering post, the gear 35 will rotate lower gear 37 which will carry the arm 38 with it. As said arm 38 is thus swung, pinion 41 will be rotated because of its engagement with the teeth of the fixed gear 43. When pinion 41 is thus rotated, it will rotate pinion 39 and the eccentric connection of this pinion to the bar 46 will cause the bar 46 to be moved accordingly and in a manner to cause the spindle 36 to be rotatively moved to the required extent. Due to the linkage between said spindle 36 and the wheel 2, and consisting of the links 10 and 16 and bell-cranks 6 and 13, the wheel 2 will be accordingly turned to the required angle.

The description thus far given relates to the turning means for only one of the front wheels, namely, the wheel shown at 2. A similar turning movement for the other wheel, or that shown at 3, is attained by the mechanism at the left of Fig. 5, and which is substantially similar to that by means of which the turning of the wheel 2 is effected.

By reference to Figs. 5 and 6 it will be noted that the bell-crank 26 is secured on a spindle 50 about which the lower gear 51 is loosely fitted and which gear 51 is in mesh with the main gear 35 in a manner similarly to gear 37. Gear 51 is fastened to an arm 52, which is also loose on the spindle 50, and the arm 52 carries the intermeshed pinions 53 and 54. Pinion 53 is in mesh with the fixed gear 55, secured to the plate 56 mounted in the housing 32 by screws 45a in the manner described with respect to plate 44. Bar 57 is eccentrically connected to the pinion 54 in the manner in which bar 46 is connected to pinion 39, and bar 57 slidably passes through a transverse aperture in the hub 58 of the spindle 50. Thus, through the mechanism above described it will be apparent that when the gear 35 is rotated, the gearing will cause rotative movement of the two spindles 36 and 50 in the same direction and through the linkage which connects the spindles to the vertical pivots 5 and 18 of the two wheels 2 and 3, these wheels will be turned accordingly. Stop pins 59 and 60 provided within the housing 32 at the proper locations, serve to limit the swing of the arms 38 and 52 when one of the wheels reaches the approximate ninety-degree angle.

Figure 2:
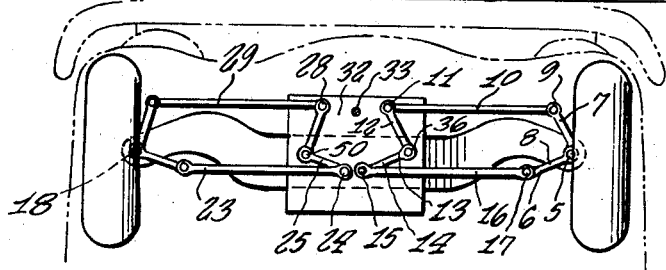
Fig. 2 is a top plan view of the structure shown in Fig. 1.

When the gearing is in the position shown in full lines in Fig. 5, the wheels 2 and 3 will be directed for straight-ahead travel, or as shown in Fig. 2. When the parts have been moved to the positions indicated in dotted lines at 61 in Fig. 5, the wheels have been turned to the maximum extent for steering to the left, as shown in Fig. 3, and when the parts are moved to the position shown in dotted lines at 62 in Fig. 5, the wheels have been moved to the maximum extent for steering to the right, or as seen in Fig. 4.

Figure 3:
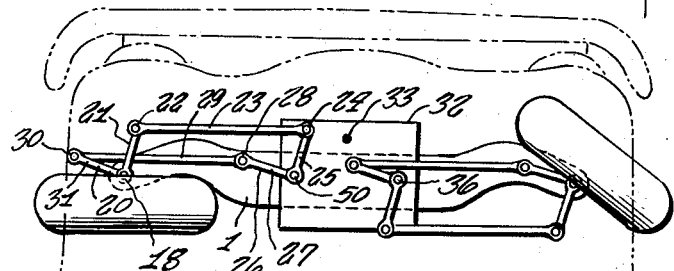
Fig. 3 is a similar plan view, with a portion of the vehicle shown in dotted lines, and with the wheels swung to the extreme left in order to steer the car in that direction.
Figure 4:
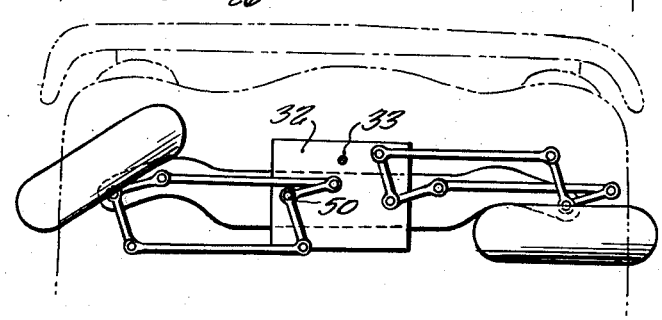
Fig. 4 is a similar plan view, showing the wheels swung to the extreme right for steering of the vehicle in that direction.

When the wheels are moved as above described, it will be apparent that the parking of the car in a small space with a minimum of wheel manipulation will be apparent, since the rear wheels will constitute pivotal points around which the car will swing when the front wheels are arranged in either of the positions shown in Figs. 3 and 4. Through the gearing employed in conjunction with the linkage extending between the gearing and the wheels, a smooth turning operation without slipping of the wheels through the entire arc of swing is attained and manipulation of the car during road travel is relatively easy.

Having described a single embodiment of the invention, it is obvious that the same is not to be restricted thereto, but is broad enough to cover all structures coming within the scope of the annexed claims.

What I claim is:

1. A steering mechanism of the character described, comprising a main gear, means for rotating the same from a steering wheel, a spindle, a gear loosely arranged on the spindle and in mesh with the main gear, an arm attached to the gear and pivotal around the spindle, a pair of meshed pinions rotatively carried on the arm, a fixed gear arranged around the spindle, one of the pinions being in mesh with said fixed gear, a bar slidable through the spindle, an eccentric connection between said bar and the other pinion, a wheel rotative about a vertical pivot, and linkage extending between said pivot and the spindle to cause rotative movement of the pivot when the spindle is rotatively turned by steering-wheel movement.

2. A steering wheel mechanism for automotive vehicles comprising, a vehicle wheel mounted for movement on a vertical pivot, a bell-crank on said pivot, a gear housing in which a spindle is mounted, a bell-crank on said spindle, links extending between the arms of the first bell-crank to the arms on the second bell-crank, an arm rotative around the spindle, meshed pinions on the arm, a fixed gear arranged around the spindle, one of the pinions being in mesh with said gear, an eccentric pivot pin on the other pinion, a bar pivotally attached to said pivot pin, the bar having an end portion slidably attached to the spindle, and steering mechanism operative from the steering wheel of the vehicle for causing turning movement of the arm around the spindle upon turning movement of the steering wheel.

3. A steering mechanism of the character described comprising, a main gear, a shaft driven from a steering post for rotating the main gear from the steering wheel, a gear housing containing a spindle, a gear loosely arranged on the spindle and in mesh with the main gear, an arm attached adjacent one end to the gear and pivotal around the spindle, a pair of meshed pinions rotatively carried on a face of the arm, a fixed gear arranged around the spindle, one of the pinions being in mesh with said fixed gear, a bar having an end portion slidable through the spindle, an eccentric connection between the other end of said bar and the other pinion, a vehicle wheel rotative about a vertical pivot, and linkage extending between said pivot and the spindle to cause rotative movement of the pivot when the spindle is rotatively turned by steering-wheel movement.

4. A steering wheel mechanism for automotive vehicles comprising, a vehicle wheel mounted for movement on a vertical pivot, a bell-crank secured on said pivot, a gear housing in which a spindle is mounted, a bell-crank secured on said spindle, links extending between the arms of the first bell-crank to the arms of the second bell-crank, an arm arranged on and rotative around the spindle, meshed pinions rotatively carried on the arm, a fixed gear arranged around the spindle, one of the pinions being in mesh with said fixed gear, an eccentric pivot pin on the other pinion, a bar pivotally attached to said pivot pin, the bar having an end portion slidably attached to the spindle, and steering mechanism operative from the steering wheel of the vehicle for causing turning movement of the arm around the spindle upon turning movement of the steering wheel.

5. A steering apparatus of the character described comprising, a pair of vehicle wheels having vertical pivot pins, a gear housing containing a pair of rotatively-mounted spindles, linkage between each of the pivot pins and each of the spindles to cause rotative movement of the pivot pins about vertical axes when the spindles are rotatively moved, a main gear in the housing, means by which movement of a steering wheel is transmitted to said main gear, each of the spindles having a loose gear arranged around it, both of said loose gears being in mesh with the main gear, a fixed gear arranged around each of the spindles, each loose gear carrying an arm, each arm carrying a pair of rotative, intermeshed pinions, one of the pinions in each pair being in mesh with the respective fixed gears, the other pinion in each pair being eccentrically and pivotally attached to separate bars, one of said bars being slidably coupled to one of the spindles and the other of said bars being slidably connected to the other spindle to thereby cause a turning movement of both wheels in the same direction when the main gear is rotated.

6. In an apparatus as provided for in claim 3, wherein the slidable connection between the bar and spindle resides in the provision of a hub on said spindle having an aperture extending through the same, the bar being slidable through said aperture.

7. A steering apparatus of the character described, comprising, a pair of vehicle wheels having vertical pivot pins, a gear housing containing a pair of rotatively mounted spindles, linkage between each of the pivot pins and a respective spindle to cause rotative movement of the pivot pins about vertical axes when the spindles are rotatively moved, a main gear rotatively mounted in the housing, means by which movement of a steering wheel is trasmitted to said main gear, each of the spindles having a loose gear arranged around it, said loose gears being in mesh with the main gear, a fixed gear arranged around each of the spindles, each loose gear carrying an arm, each arm carrying a pair of rotative, intermeshed pinions, one of the pinions in each pair being in mesh with a respective fixed gear, the other pinion in each pair being eccentrically and pivotally attached to a bar, one of said bars being slidably coupled to one of the spindles and the other of said bars being slidably connected to the other spindle to thereby cause a turning movement of both wheels in the same direction when the main gear is rotated, the linkage between the pivot pins and spindle consisting in bell-cranks on the pivot pins and bell-cranks on the spindles and links extending between the bell-cranks.

8. A steering mechanism of the character described, for a vehicle having a steering wheel, comprising, a front axle, a pair of wheels rotative on a stub axle at the ends of said axle, each stub axle having a vertical pivot pin, a gear housing supported on the axle between the wheels, a pair of rotative spindles in said housing, linkage between one of said pair of spindles and one of said pivot pins and corresponding linkage between the other spindle and the other pivot pin whereby rotative movement of each spindle will rotate the pivot pin to which said spindle is linked, said linkage consisting of a bell crank on each of sad pivot pins, a bell crank on each of said spindles, and links extending between each of said bell cranks and the corresponding steerable wheel on the same side of the vehicle as said bell cranks, whereby movement of both of the wheels in the same direction is caused, and gearing contained within the gear housing for causing simultaneous rotative movement of the spindles in the same direction upon rotative movement of the steering wheel of the vehicle.

9. A steering mechanism comprising a vertical rotative spindle, a gear loose thereon, a driving gear in mesh with the loose gear, an arm attached to the loose gear and carrying a pair of intermeshed pinions, a fixed gear, one of the pinions being in mesh with the fixed gear, the second pinion having an eccentrically-positioned pin, a bar pivoted at one end to said pin and having its other end extended through the spindle, a verticle wheel having a vertical pivot, and linkage extending between said pivot and the spindle whereby turning movement of the spindle will turn the pivot.

10. A steering mechanism comprising a main gear adapted to be rotated by a steering column, a first gear which meshes with said main gear, a spindle, said first gear loosely mounted on said spindle, a second gear fixedly mounted on said spindle, an arm carrying two intermeshed pinions, one of said pinions being meshed with said second gear, said arm loosely mounted on said spindle and fastened to said first gear, a bar connected to a pivot eccentrically mounted on the one of said pinions farthest from said spindle, and linkage extending between said pivot and said spindle to cause rotative movement of the pivot when the spindle is rotatively turned by steering-wheel movement.

References Cited in the file of this patent
FOREIGN PATENTS 716,320    Great Britain _____ Oct. 6, 1954